United States Patent Office 2,976,279
Patented Mar. 21, 1961

2,976,279

2,3,6-TRIS-AZIRIDINO-1,4 BENZOQUINONE

Walter Gauss, Leverkusen-Bayerwerk, Leverkusen, and Gerhard Domagk, Wuppertal-Elberfeld, Germany, assignors to Schenley Industries, Inc., a corporation of Delaware No Drawing. Filed Mar. 11, 1958, Ser. No. 720,548

Claims priority, application Germany Mar. 14, 1957

1 Claim. (Cl. 260—239)

This invention relates generally to certain novel organic chemical compounds useful in chemotherapy, together with process for producing the same, and more particularly is concerned with certain novel aziridinoquinones and aziridinohydroquinones that are useful in treatment of amebiasis, including amebic colitis, amebic hepatitis, amebic abscesses, and amebic dysentery, produced by the parasitic microorganism, *Entamoeba histolytica*.

It is well known that human disease conditions produced by the parasitic microorganism *Entamoeba histolytica* present a severe public health problem, especially in tropical countries and in localities where proper sanitary precautions are not observed. Heretofore, acute cases have been treated with emetine hydrochloride administered subcutaneously, but this drug has the disadvantage that while it is active against the trophozoites, it is inactive against the amebic cysts, hence it is not useful to eliminate chronic amebiasis or carriers. A further disadvantage of this drug is its high toxicity which can result in fatal effects if the administration accidentally is intravenous instead of merely subcutaneous.

Another compound that has been used in treating amebiasis is 5,7-diiodo-8-hydroxyquinoline but this compound like emetine, has the disadvantage of not being effective against the amebic cysts, in this case due to excessively rapid absorption of the drug before it can be carried to the lumen of the bowel. It follows therefore that these drugs which are commonly regarded as the best chemotherapeutic agents currently available for treating amebiasis are restricted in their utility and ineffectual for control of chronic cases or of amebic carriers.

In accordance with the present invention certain heretofore unknown chemical compounds are provided that show strong activity against *Entamoeba histolytica* and that, because they are suitable for administration intravenously and orally, may be used in control of the disease condition in either the precystic stages or when the cysts are produced in the lumen of the bowel.

The novel compounds in accordance with this invention are derivatives of 1,4-benzoquinone or 1,4-benzohydroquinone having at least two aziridino groups as molecular substituents in the 2 and 6 positions, with possible further substitution of a third aziridino group in the 3 position. Solutions of these compounds show high activity against *Entamoeba histolytica* in dilutions of $1:10^{3.5}$.

Specifically, the novel compounds of this invention are substances chosen from the group consisting of 2,6-bis-aziridino-1,4-benzohydroquinone, 2,6-bis-aziridino-1,4-benzoquinone and 2,3,6-tris-aziridino-1,4-benzoquinone.

It is known that para-benzoquinones having in the ortho position at least one lower alkoxy group of a type exchangeable with an amine group to produce an amino substituent group are capable of reacting with aziridine and substituted aziridines to produce ortho-aziridino-para-benzoquinones. It is also known that this reaction takes place with 2,5-bis-alkoxy-1,4-benzoquinones to produce corresponding 2,5-bis-aziridino compounds. Heretofore, however, no 2,6-bis-aziridino-1,4-benzoquinone or 2,6-bis-azirdino-1,4-benzohydroquinone have been prepared because the orienting effect has been regarded as being such that compounds of this molecular configuration would not be produced.

In accordance with certain of the process aspects of the present invention, a novel method is provided for making derivatives of 1,4-benzohydroquinone and 1,4-benzoquinone bearing aziridino groups as substituents in the 2 and 6 positions. The process involves control of the reaction environment in terms of use of a diluent, a substantial excess of one of the reactants, prolonged reaction at room temperatures and reaction under anaerobic conditions. In this process, using 1,4-benzoquinones having in each of the 2 and 6 positions a lower alkoxy substituent, the reaction products obtained are mixtures of 2,6-bis-aziridino-benzohydroquinone and 2,3,6-tris-aziridino-benzoquinone. The reaction products may be separated from each other and the reaction mixture in conventional manner by methods based upon use of preferential solvents.

Among the 2,6-dialkoxy-1,4-benzoquinones that may be used as starting materials in practice of the process according to this invention may be mentioned compounds in which the alkoxy group is that derived from a lower alkanol, e.g., one having at most 4 carbon atoms in the chain. Of the compounds of this group, 2,6-dimethoxy-1,4-benzoquinone is chiefly preferred.

It is preferred to perform the process according to this invention by mixing the reactants, the 2,6-bis-alkoxy-1,4-benzoquinone and aziridine, in an inert liquid diluent, such as a lower alkanol having at most 4 carbon atoms in its chain, and under anaerobic conditions, permitting the reactants to enter into reaction at a controlled temperature of at most room temperature (about 20° C.) or, preferably, at a lower temperature, for instance, 0° C. or thereabouts. Initially the benzoquinone reactant remains undissolved in the reaction mixture but as it enters into reaction with aziridine it passes into solution, simultaneously producing both a colorless and a colored reaction product which is precipitated from the reaction mixture. It is evident that the reaction products differ from the undissolved reactant from the fact that they are of different colors, i.e., using 2,6-dimethoxy-1,4-benzoquinone, which is a yellow substance, as a reactant with aziridine, a colored suspension is produced with precipitated colorless and purple reaction products which are separated from the mixture by filtration immediately after the last portion of the yellow starting material passes into reaction. The separated reaction products are separated from each other by use of preferential solvents, for example, the purple precipitate can be leached from the mixture of solids by use of cold acetone, benzene or chloroform and recovered from the leaching solution by solvent evaporation. It may be purified by recrystallization from acetone or ethyl acetate and is found to be 2,3,6-tris-aziridino-1,4-benzoquinone having an empirical formula $C_{12}H_{13}N_3O_2$ and melting at 162.5° to 163.0° C.

The precipitated colorless reaction product which, surprisingly, is 2,6-bis-aziridino-1,4-benzohydroquinone, may be purified by recrystallization from dioxane or other similar common organic solutions. Comparative tests establish that in this compound the aziridino groups occupy the 2 and 6 positions and comparison of this compound with the 2,5-bis-aziridino-benzohydroquinone described in Helv. Chem. Acta 38, 1473–89 (1955) shows the compounds to be chemically dissimilar.

In accordance with certain further process aspects of this invention, the 2,6-bis-aziridino-1,4-benzohydroquinone produced as above described may be oxidized to the corresponding 2,6-bis-aziridino-1,4-benzoquinone.

This oxidation reaction preferably is carried out in a solvent reaction medium which may be an aqueous, organic, or aqueous-organic medium. A suitable oxidizing agent for this purpose is para-benzoquinone. The reaction product, 2,6-aziridino-1,4-benzoquinone is obtained (after recrystallization) as an orange-colored crystalline product melting at 166–167° C. with decomposition. It may be differentiated readily from the known 2,5-bis-aziridino-1,4-benzoquinone and also from the 4,5-bis-aziridino-1,2-benzoquinone described in Beriche 89, 2768–73 (1956).

Each of the three reaction products above mentioned is active against the parasitic microorganism *Entamoeba histolytica*.

To facilitate a fuller and more complete understanding of the subject matter of this invention, two specific examples herewith follow but it is clearly to be understood that these examples are provided by way of illustration merely and are not to be construed as imposing limitations upon the scope of the invention defined in the subjoined claim.

Example 1

Under anaerobic conditions including an atmosphere of nitrogen, 104 cubic centimeters (2.0 moles) of aziridine is added as a single portion with stirring to a suspension of 33.6 grams (0.2 mole) of 2,6-dimethoxy-1,4-benzoquinone in 500 cubic centimeters of absolute methanol at a temperature of 0° to 5° C. After the addition has been completed the external cooling of the reaction vessel is replaced by a room temperature water bath and the mixture is stirred at room temperature for 45 hours while a slow stream of nitrogen is passed therethrough to preserve the anaerobic reaction conditions. It is found that the yellow starting material, during this period, completely disappears into solution and that a violet or purple substance together with a colorless substance are formed as precipitated reaction products. This mixture of precipitated products is removed by filtration at $-20°$ C. and the residue is washed with a small quantity of cooled methanol. Then the mixture is dried in a vacuum desiccator yielding about 30.4 grams of mixed product. The mixed product is extracted with benzene whereby the violet or purple colored component passes into solution and the substantially colorless product remains in a yield of about 16.0 grams. The colorless product so obtained melts with decomposition at about 221–222° C. with melting starting at about 200° C. It can be purified by recrystallization from a large column of dioxane yielding snow-white crystals that decompose when heated at 222–224° C. while starting to melt at 220° C.

Analysis of a sample of this material after drying under high vacuum establishes that the substance is 2,6-bis-aziridino-1,4-benzohydroquinone having the empirical formula $C_{10}H_{12}N_2O_2$ and a molecular weight of 192.21. Analysis revealed the following data:

Calculated: C, 62.48; H, 6.29; N, 14.58. Found: C, 62.13, 62.31; H, 5.98, 6.22; N, 14.70, 14.65.

This substance is active against *Entamoeba histolytica* in a dilution of $1:10^{3.5}$ and even in dilutions as great as $1:10^4$ it retains activity against this parasitical microorganism.

The benzene extract of the colored reaction product is evaporated to dryness under vacuum, yielding a residue melting at 161–162° C. which is recrystallized from 200 cubic centimeters of ethyl acetate, filtered under suction at $-20°$ C., washed with cold methanol and thus yields about 11.5 grams of a pure, purple-colored crystalline product melting at 162.5–163° C. This product is 2,3,5-tris-aziridino-1,4-benzoquinone, having an empirical formula $C_{12}H_{13}N_3O_2$ and a molecular weight of 231.25. Analysis of this product after drying under high vacuum for 2 hours at 40° C. revealed the following data:

Calculated: C, 62.32; H, 5.67; N, 18.17; O, 13.84. Found: C. 62.27, 62.51; H, 5.77, 5.76; N, 18.06, 18.14; O, 14.13.

This substance is active against the microorganism *Entamoeba histolytica* in dilution of $1:10^{4.5}$ and is active even in a dilution of $1:10^5$.

If the foregoing operations are performed under aerobic conditions i.e., in an atmosphere of oxygen, the yield of 2,6-bis-aziridino-hydroquinone is reduced to 0.36 gram and the remainder of the mixture consists of products that fail to crystallize but instead quickly turn to an insoluble resin.

Example 2

About 2.71 grams of 2,6-bis-aziridino-1,4-hydroquinone prepared in the manner described in Example 1 is suspended in 80 cubic centimeters of water and, while cooling the mixture in an ice-salt bath, a solution of 1.83 grams of para-benzoquinone in 30 cubic centimeters of methanol is added. The red solution initially formed quickly congeals to a paste which is immediately filtered under suction and the residue is washed with a mixture of equal parts methanol and water at a temperature of $-20°$ C. The residue is recrystallized from methanol, yielding red crystalline needles that melt with decomposition at 166–167° C. and which are identifiable as 2,6-bis-aziridino-1,4-benzoquinone having an empirical formula $C_{10}H_{10}N_2O_2$ and a molecular weight of 190.20. After drying, the product upon analysis yields the following data:

Calculated: C, 63.15, H, 5.30; N, 14.73. Found C, 62.96, 63.11; H, 5.29, 5.34; N, 15.15, 15.06.

This substance is active against the microorganism *Entamoeba histolytica* in dilution of $1:10^{4.5}$ and remains active even when diluted to $1:10^5$.

Having thus described the subject matter of this invention, what it is desired to secure by Letters Patent of the United States is:

As a new composition of matter, 2,3,6-trisaziridino-1,4-benzoquinone.

References Cited in the file of this patent

UNITED STATES PATENTS 2,770,617     Marxer _____ Nov. 13, 1956

OTHER REFERENCES

Gauss et al.: Helvetica Chimica Acta, vol. 39, p. 331 (1956).

Gauss et al.; Angewandte Chemie, vol. 67, p. 227 (1955).